United States Patent
Yoon et al.

(10) Patent No.: US 12,443,837 B2
(45) Date of Patent: Oct. 14, 2025

(54) NEURAL NETWORK ACCELERATOR IN DIMM FORM FACTOR

(71) Applicant: Google LLC, Mountain View, CA (US)

(72) Inventors: Doe Hyun Yoon, Foster City, CA (US); Lifeng Nai, Sunnyvale, CA (US); Peter Ma, Mountain View, CA (US)

(73) Assignee: Google LLC, Mountain View, CA (US)

( * ) Notice: Subject to any disclaimer, the term of this patent is extended or adjusted under 35 U.S.C. 154(b) by 921 days.

(21) Appl. No.: 16/994,990

(22) Filed: Aug. 17, 2020

(65) Prior Publication Data
US 2022/0051089 A1 Feb. 17, 2022

(51) Int. Cl.
| | |
|---|---|
| G06F 12/08 | (2016.01) |
| G06F 9/30 | (2018.01) |
| G06F 9/38 | (2018.01) |
| G06F 12/02 | (2006.01) |
| G06F 13/40 | (2006.01) |
| G06N 3/063 | (2023.01) |
| G06N 3/065 | (2023.01) |
| G06N 3/08 | (2023.01) |

(52) U.S. Cl.
CPC .......... *G06N 3/065* (2023.01); *G06F 9/30098* (2013.01); *G06F 9/3877* (2013.01); *G06F 13/4027* (2013.01); *G06N 3/08* (2013.01)

(58) Field of Classification Search
CPC .......... G06N 3/065; G06N 3/08; G06N 3/063; G06F 9/30098; G06F 9/3877; G06F 13/4027; G06F 15/7803
See application file for complete search history.

(56) References Cited

U.S. PATENT DOCUMENTS

| | | | | |
|---|---|---|---|---|
| 5,701,438 | A * | 12/1997 | Bains | G06F 12/0684 711/E12.089 |
| 7,089,391 | B2 * | 8/2006 | Geiger | G06F 12/08 711/170 |
| 9,424,173 | B2 * | 8/2016 | Dinkjian | G06F 12/02 |
| 10,649,927 | B2 * | 5/2020 | Raghava | G06F 13/1668 |
| 2004/0143719 | A1 * | 7/2004 | Nguyen | G06F 11/2284 711/202 |

(Continued)

OTHER PUBLICATIONS

Summons to Attend Oral Proceedings for European Patent Application No. 21156138.6 dated Jan. 17, 2023. 10 pages.

(Continued)

*Primary Examiner* — Brandon S Cole
(74) *Attorney, Agent, or Firm* — Lerner David LLP

(57) ABSTRACT

The technology relates to a neural network dual in-line memory module (NN-DIMM), a microelectronic system comprising a CPU and a plurality of the NN-DIMMs, and a method of transferring information between the CPU and the plurality of the NN-DIMMS. The NN-DIMM may include a module card having a plurality of parallel edge contacts adjacent to an edge of a slot connector thereof and configured to have the same command and signal interface as a standard dual in-line memory module (DIMM). The NN-DIMM may also include a deep neural network (DNN) accelerator affixed to the module card, and a bridge configured to transfer information between the DNN accelerator and the plurality of parallel edge contacts via a DIMM external interface.

20 Claims, 2 Drawing Sheets

(56) References Cited

U.S. PATENT DOCUMENTS

| | | | |
|---|---|---|---|
| 2008/0222338 A1* | 9/2008 | Balasubramanian | ................. G06F 9/5061 712/E9.016 |
| 2015/0222705 A1* | 8/2015 | Stephens | ................. G06F 3/067 709/214 |
| 2016/0379137 A1* | 12/2016 | Burger | ................. G06F 9/46 706/12 |
| 2017/0255567 A1* | 9/2017 | Vidyadhara | ............. G06F 13/42 |
| 2018/0121601 A1* | 5/2018 | Hahm | ................. G16B 30/10 |
| 2019/0108145 A1* | 4/2019 | Raghava | ............. G06F 13/1668 |
| 2019/0121671 A1* | 4/2019 | Guim Bernat | .......... G06F 9/505 |
| 2019/0146788 A1* | 5/2019 | Kim | ................. G11C 7/1006 712/221 |
| 2019/0362261 A1 | 11/2019 | Ahn | |
| 2020/0042362 A1* | 2/2020 | Cui | ................. G06F 12/0207 |

OTHER PUBLICATIONS

Ke et al. RecNMP: Accelerating Personalized Recommendation with Near-Memory Processing. Dec. 30, 2019. Arxiv.org, Cornell University Library, 201 Olin Library Cornell University, Ithaca, NY 14853. 14 pages.

Kwon et al. TensorDIMM: A Practical Near-Memory Processing Architecture for Embeddings and Tensor Operations in Deep Learning. Oct. 12, 2019. Proceedings of the 52nd Annual IEEE/ACM International Symposium on Microarchitecture, MICRO '52, ACM Press, New York, New York, USA, pp. 740-753, DOI: 10.1145/3352460.3358284.

Extended European Search Report for European Patent Application No. 21156138.6 dated Jul. 12, 2021. 9 pages.

"USB Accelerator", [Retrieved Aug. 11, 2020], Retrieved from internet: <https://coral.ai/products/accelerator/ >, 4 pages.

"Intel® Neural Compute Stick 2 (Intel® NCS2)", [Retrieved Aug. 11, 2020], Retrieved from the internet: <https://software.intel.com/content/www/us/en/develop/hardware/neural-compute-stick.html>, 10 pages.

"The true Processing in Memory accelerator", Hot Chips 31, Copyright UPMEM® 2019, 24 pages.

"NVDIMM", [Retrieved Aug. 11, 2020], Retrieved from the internet: <https://www.micron.com/products/dram-modules/nvdimm>, 3 pages.

Tim Finkbeiner et al., In-Memory Intelligence, IEEE Computer Society, www.computer.org/micro , Jul./Aug. 2017, 31 pages.

Brief Communication for European Patent Application No. 21156138.6 dated Jun. 22, 2023. 8 pages.

Office Action for European Patent Application No. 21156138.6 dated Aug. 31, 2022. 5 pages.

Result of Consulation for European Patent Application No. 21156138.6 dated Jul. 10, 2023. 4 pages.

Result of Consulation for European Patent Application No. 21156138.6 dated Jul. 11, 2023. 6 pages.

* cited by examiner

NEURAL NETWORK ACCELERATOR IN DIMM FORM FACTOR

BACKGROUND

As deep neural networks (DNNs) evolve, researchers have shown that DNNs are effective in not only traditional problems such as recommendation, classification, etc., but also new application domains. Some examples include databases such as BTree lookup using DNN, media compression such as JPEG's recent call for evidence of learning-based image compression, games such as AlphaStar, and scientific computing such as turbulent fluid dynamics simulations.

More and more applications may adopt the use of DNNs. Programmers may want to use a variety of DNN models, at least in some applications, through a simple interface such as a library function or a common service, and DNN inference may interact with other parts of applications at a fine granularity. For example, real-time games can use DNN models in controlling non-player characters (NPCs), these games can continuously apply different DNN models, depending on the context, with different inputs upon environmental change and observed behavior of other characters, and decision outcomes can be used to make decisions in NPC behavior, which then can trigger changes in the environment as well as other NPC behavior and can affect player action. Hence, the DNN model inference should be low-latency and should tightly interact with other parts of the program.

A DNN accelerator, such as a tensor processing unit (TPU), is typically deployed as an auxiliary computing device via PCIe or USB. Such a deployment may be adequate for a dedicated, fixed processing scenario and may be effective in batch processing. However, these deployments may have many limitations: difficulty in sharing the accelerators, software overhead in accessing PCIe or USB devices, and latency in communication, among others.

PCIe-attached accelerators (e.g., TPU or other machine learning accelerators, GPUs for desktop and servers) can be effective in batch processing or where latency is not critical, but they may not be adequate for a low-latency DNN model inference that interacts with other parts of an application at a fine granularity. Sharing PCIe devices among different applications may also be a challenge. USB-attached accelerators may be similar to the PCIe-attached devices, but they are typically used in mobile devices or embedded devices.

BRIEF SUMMARY

The present disclosure provides for a neural network dual in-line memory module (NN-DIMM), a microelectronic system comprising a CPU and a plurality of the NN-DIMMs, and a method of transferring information between the CPU and the plurality of the NN-DIMMS.

One aspect of the disclosure provides a neural network dual in-line memory module (NN-DIMM). The NN-DIMM may include a module card having a plurality of parallel edge contacts adjacent to an edge of a slot connector thereof and configured to have the same command and signal interface as a standard dual in-line memory module (DIMM). The NN-DIMM may also include a deep neural network (DNN) accelerator affixed to the module card, and a bridge configured to transfer information between the DNN accelerator and the plurality of parallel edge contacts via a DIMM external interface.

The DNN accelerator, the bridge, and the DIMM external interface may be included within a DNN accelerator chip affixed to the module card. The DNN accelerator may be included within an off-the-shelf DNN accelerator chip affixed to the module card. The bridge and the DIMM external interface may be included within a bridge chip affixed to the module card. The NN-DIMM may also include one or more memory chips affixed to the module card and connected with the bridge via an interface. The NN-DIMM may also include a memory controller connected with one or more memory chips and the bridge.

The bridge may include control registers and on-chip memory that are configured to be seen as a standard DRAM to a host CPU. The bridge may include a controller connected with the DNN accelerator, the control registers, the on-chip memory, and the DIMM external interface. The NN-DIMM may also include a power connector affixed to the module card and configured to connect to a power cable from a motherboard. The plurality of parallel edge contacts may include 288 parallel edge contacts comprising a standard DDR4 contact configuration.

Another aspect of the disclosure provides a microelectronic system comprising a CPU affixed to a motherboard, the CPU having a plurality of memory channels each including a respective neural network dual in-line memory module (NN-DIMM) electronically connected with the CPU. Each NN-DIMM may include a module card having a plurality of parallel edge contacts adjacent to an edge of a slot connector thereof and configured to have the same command and signal interface as a standard DIMM. Each NN-DIMM may also include a DNN accelerator affixed to the module card, and a bridge configured to transfer information between the DNN accelerator and the plurality of parallel edge contacts via an DIMM external interface.

The slot connector of each NN-DIMM may be mounted inside a corresponding socket connector affixed to the motherboard. Each of the memory channels may also include a standard DIMM. The plurality of memory channels may include 16 DDR4 memory channels. The DNN accelerator, the bridge, and the DMM external interface of each NN-DIMM may be included within a respective DNN accelerator chip affixed to the respective module card. The DNN accelerator of each NN-DIMM may be included within a respective off-the-shelf DNN accelerator chip affixed to the respective module card, and the bridge and the DIMM external interface of each NN-DIMM may be included within a respective bridge chip affixed to the respective module card.

Another aspect of the disclosure provides a method for transferring information between a host system CPU and a plurality of NN-DIMMs. The method may include electrically connecting each of the NN-DIMMs to the host system CPU, the CPU having a plurality of memory channels each including a respective one of the NN-DIMMs, each NN-DIMM comprising a deep neural network (DNN) accelerator and a bridge configured to transfer the information between the DNN accelerator and the host system CPU via a DIMM external interface. The method may also include transferring the information between the host system CPU and the plurality of NN-DIMMs.

The method may also include the host system controlling the NN-DIMMs through memory read and write operations. The bridge of each of the NN-DIMMs may include control registers and on-chip memory that are seen as a standard DRAM to the host system CPU. Each of the NN-DIMMs may include a module card having a plurality of parallel edge contacts adjacent an edge of a slot connector thereof and having the same command and signal interface as a standard DIMM. The slot connector of each NN-DIMM may be mounted inside a corresponding socket connector affixed to a motherboard. The host system CPU may be affixed to the motherboard. The plurality of memory channels may include 16 DDR4 memory channels.

DETAILED DESCRIPTION

Figure 1A:
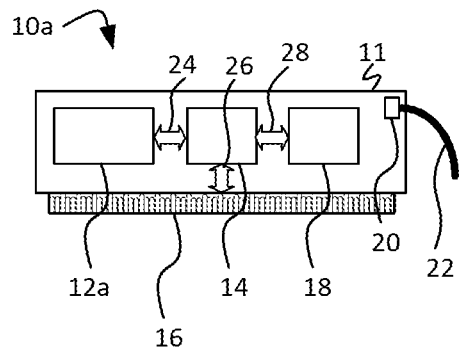
FIG. 1A shows a design of a DNN accelerator without a DRAM interface, in accordance with aspects of the disclosure.
Figure 1B:
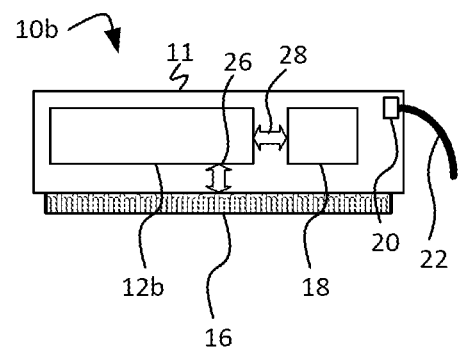
FIG. 1B shows a design of a DNN accelerator including a bridge capability, in accordance with aspects of the disclosure.

FIGS. 1A and 1B respectively show a NN-DIMM 10a and a NN-DIMM 10b, which are DNN accelerators. The NN-DIMMs 10a and 10b may each be a complete, independent system in a DIMM form factor with a standard DRAM interface, such as a DDR4 standard for a DIMM form factor and a DRAM interface, as shown in FIGS. 1A and 1B. DDR4 is used as an example in this disclosure, but alternatively, any other types of standards may be used, such as future DDR5, SO-DIMM DDRx, etc.

As shown in FIG. 1A, the NN-DIMM 10a has an off-the-shelf DNN accelerator chip 12a without a DIMM external DDR4 interface, thereby requiring a bridge chip 14. In the variation shown in FIG. 1B, the NN-DIMM 10b may have a DNN accelerator chip 12b with integrated bridge functionality. The NN-DIMMs 10a and 10b each have a module card 11 having a DIMM form factor with a standard DIMM slot connector 16 configured to be mated with a standard DIMM socket connector on a motherboard. The slot connector 16 may have a plurality of parallel edge contacts adjacent to an edge of the slot connector and configured to have the same command and signal interface as a standard DIMM. The NN-DIMMs 10a and 10b may each have optional memory 18 and an optional power connector 20 configured to connect to a power cable 22 from a motherboard. Depending on the design, the NN-DIMMs 10a and 10b may have an additional power source (through the power cable 22 from the motherboard to the NN-DIMM), if the power supply through the DIMM slot connector 16 is not enough for the DNN accelerator chip 12a or 12b and the other chips on the NN-DIMMs.

The off-the-shelf DNN accelerator chip 12a of the NN-DIMM 10a typically does not have a DDR4 interface, so the NN-DIMM 10a includes a bridge chip 14 that is connected with the DNN accelerator chip through a standard or a custom interface 24 and that is connected with the DIMM slot connector 16 via a DIMM external DDR4 interface 26. The bridge chip 14 may also implement I/O and control functions for the DNN accelerator chip 12a. The bridge chip 14 may also be connected with the optional memory 18 via an interface 28. Memory 18 may include, for example, one or more memory chips.

The DNN accelerator chip 12b of the NN-DIMM 10b may include the bridge capability of the bridge chip 14. The DNN accelerator chip 12b may be connected with the DIMM slot connector 16 via the DIMM external DDR4 interface 26. The DNN accelerator chip 12b may also be connected with the optional memory 18 via an interface 28.

The NN-DIMMs 10a and 10b are different from processing in memory (PIM), such as PIM-DIMM. The NN-DIMMs 10a and 10b use a physical DIMM form factor to install a DNN accelerator chip 12a or 12b and a standard DRAM interface 26 for communicating with the NN-DIMMs. The NN-DIMMs 10a and 10b do not integrate computing cores therein.

The DNN accelerator chips 12a and 12b may each be any DNN accelerator chip, such as a TPU, an edge TPU, etc. The DNN accelerator chips 12a, 12b may include control, dedicated computing units for the DNN, on-chip memory, and off-chip memory, such as LPDDRx, HBM, or the like. As the NN-DIMMs 10a and 10b have a DIMM form factor and are configured to be operated via a standard DIMM slot connector 16, the physical size and power usage should of the NN-DIMMs should fit within a standard DIMM specification. Optionally, the NN-DIMMs 10a and 10b may be coupled via the power cable 22 to a separate power connector from the motherboard, if the DNN accelerator chips 12a or 12b and/or other components in the NN-DIMMs use more power than the standard DIMM specification allows.

Figure 2:
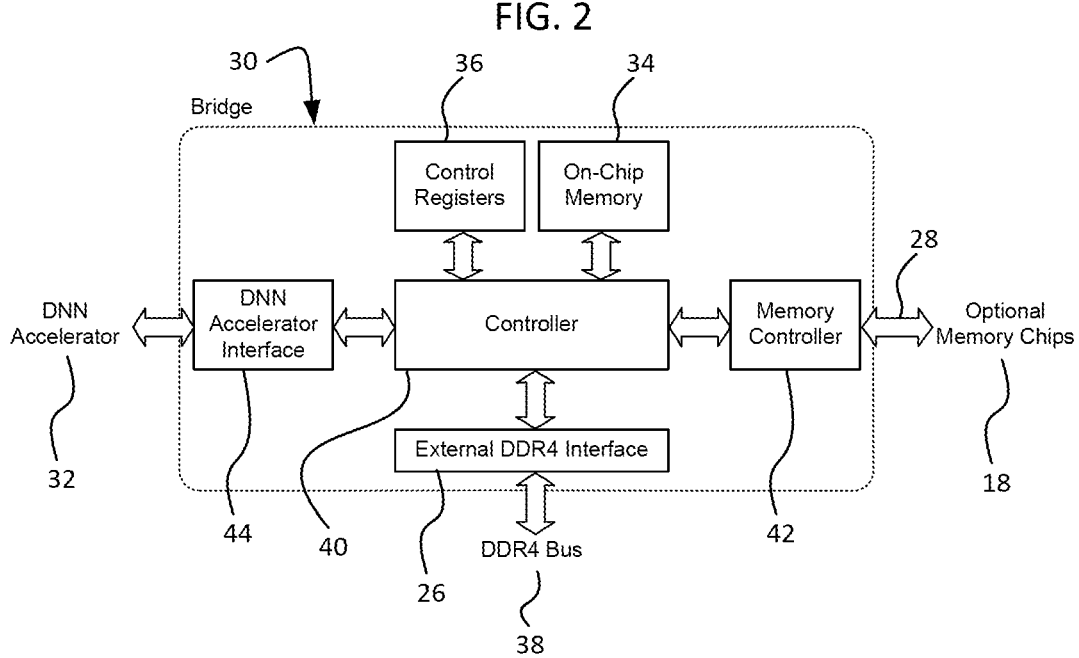
FIG. 2 shows an example bridge organization, in accordance with aspects of the disclosure.

The bridge capability of the NN-DIMMs 10a and 10b, whether disposed within the DNN accelerator chip 12b or disposed within the bridge chip 14, may be structured as shown in FIG. 2. The bridge 30 may connect a DNN accelerator 32, an DIMM external DDR4 interface 26, and the optional DIMM-internal memory chips 18. The DNN accelerator may be disposed within the DNN accelerator chip 12b or disposed within the bridge chip 14. The bridge 30 may include on-chip memory 34 and control registers 36, which will be exported as "memory" so that a host CPU can access them through memory read and write operations. The bridge 30 is configured to create an illusion that the DNN accelerator 32, including control registers 36 and on-chip memory 34, will be seen as a standard DDR4 DRAM to the host CPU. The DIMM external DDR4 interface 26 may be connected with a DDR4 bus 38 within the DIMM slot connector 16.

The bridge 30 may also include a controller 40 that is connected with the control registers 36, the on-chip memory 34, the external DDR4 interface 26, a memory controller 42, and a DNN accelerator interface 44 that is in turn connected with the DNN accelerator 32. The memory controller 42 may be connected with the optional memory chips 18 via the interface 28. The bridge 30 may implement the memory controller 42 to access these optional memory chips 18. The optional memory chips 18 may be used for temporary data, hosting multiple DNN models, and other uses.

In some examples the memory controller 42 may require identical timing parameters among the DIMMs on the memory channel. Examples of such parameters may include row activation latency [tRAS], column access latency [tCAS], row precharge latency [tPRE], or the like. In such examples where identical timing parameters are required, the bridge 30 will set the DDR4 timings for accessing on-chip memory and control registers to be the same as other DDR4 DIMMs on the same channel. If the memory controller 42 can handle different timing parameters among the DIMMs on the same memory channel, the bridge will provide the NN-DIMM 10a or 10b with the fastest possible DDR4 timing parameters that the DDR4 standard allows.

The bridge 30 is configured to map the control registers 36 and/or the on-chip memory 34 to one row of a few banks of the NN-DIMM 10a or 10b. Then, from the host CPU, the control registers 36 and/or the on-chip memory 34 will always access the same row in those banks in the NN-DIMM 10a or 10b. This way, access can be very fast, with only column read/write commands.

The bridge 30 may receive a new DNN model and its supplemental information from the host CPU. The supplemental information may include, for example, a checkpoint. The new DNN model and supplemental information can be forwarded to memory in the DNN accelerator 32 or the optional memory chips 18. Multiple DNN models can be loaded into the NN-DIMM 10a or 10b, such as by a memory write from the host CPU, either on the DNN accelerator memory or the optional memory chips 18. If the multiple DNN models are loaded to the optional memory chips 18, the bridge 30 will load the DNN model from the optional memory chips to the DNN accelerator 32 when necessary.

Once the CPU host requests a model inference by a memory write from the host CPU to the control registers 36, the bridge 30 may forward the inference request to the DNN accelerator 32. Once it is finished, the result is placed in a specific memory region so that the host CPU can read it. As a standard DIMM external DDR4 interface 26 does not implement asynchronous acknowledgement, the bridge 30 will have a specific memory-mapped register for notifying when requests are done. The host CPU can periodically poll the memory location to check whether the request is finished. The bridge 30 may also be configured to implement a debugging interface to the DNN accelerator 32.

Figure 3:
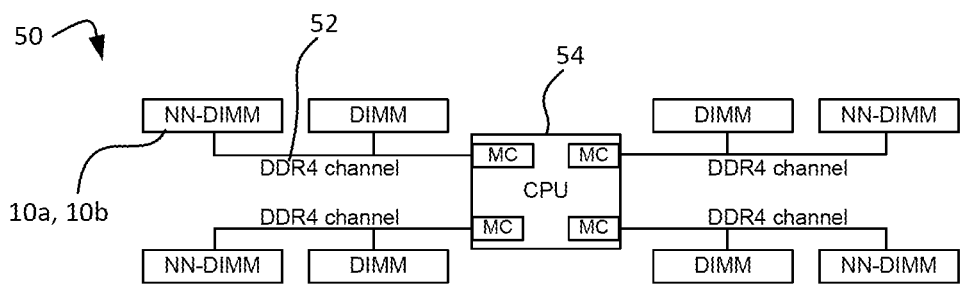
FIG. 3 shows a system including DIMMs and NN-DIMMs, in accordance with aspects of the disclosure.

Referring to FIG. 3, a host system 50 may have NN-DIMMs 10a and/or 10b installed on corresponding DDR4 memory channels 52 that are connected to a CPU 54. The NN-DIMMs 10a and/or 10b will behave like DDR4 DIMMs, such that the host system 50 may control the NN-DIMMs through memory read and write operations. To be able to run the NN-DIMMs 10a and/or 10b on the DIMM socket connectors of the host system 50, the total power usage of each of the NN-DIMMs should be less than the maximum power defined in the DRAM DIMM specification, or alternatively, each NN-DIMM may have a separate power connection from the motherboard via the power cable 22 and the optional power connector 20 (see FIGS. 1A and 1B).

In the example shown in FIG. 3, the host system 50 may include both DIMMs 56 and the NN-DIMMs 10a and/or 10b, and each of the memory channels 52 may include one of the NN-DIMMs. The actual configuration can be flexible. For example, only one of the memory channels 52 may have an NN-DIMM 10a or 10b. In another example, the host system 50 may include a separate memory channel 52 with many NN-DIMMs 10a and/or 10b. For example, a host system 50 that is a server CPU, such as a ROME, may have 8 DDR4 channels. In such an example, with a 1 NN-DIMM per channel configuration, a 2-socket server tray may have 16 NN-DIMMs 10a and/or 10b.

Figure 4:
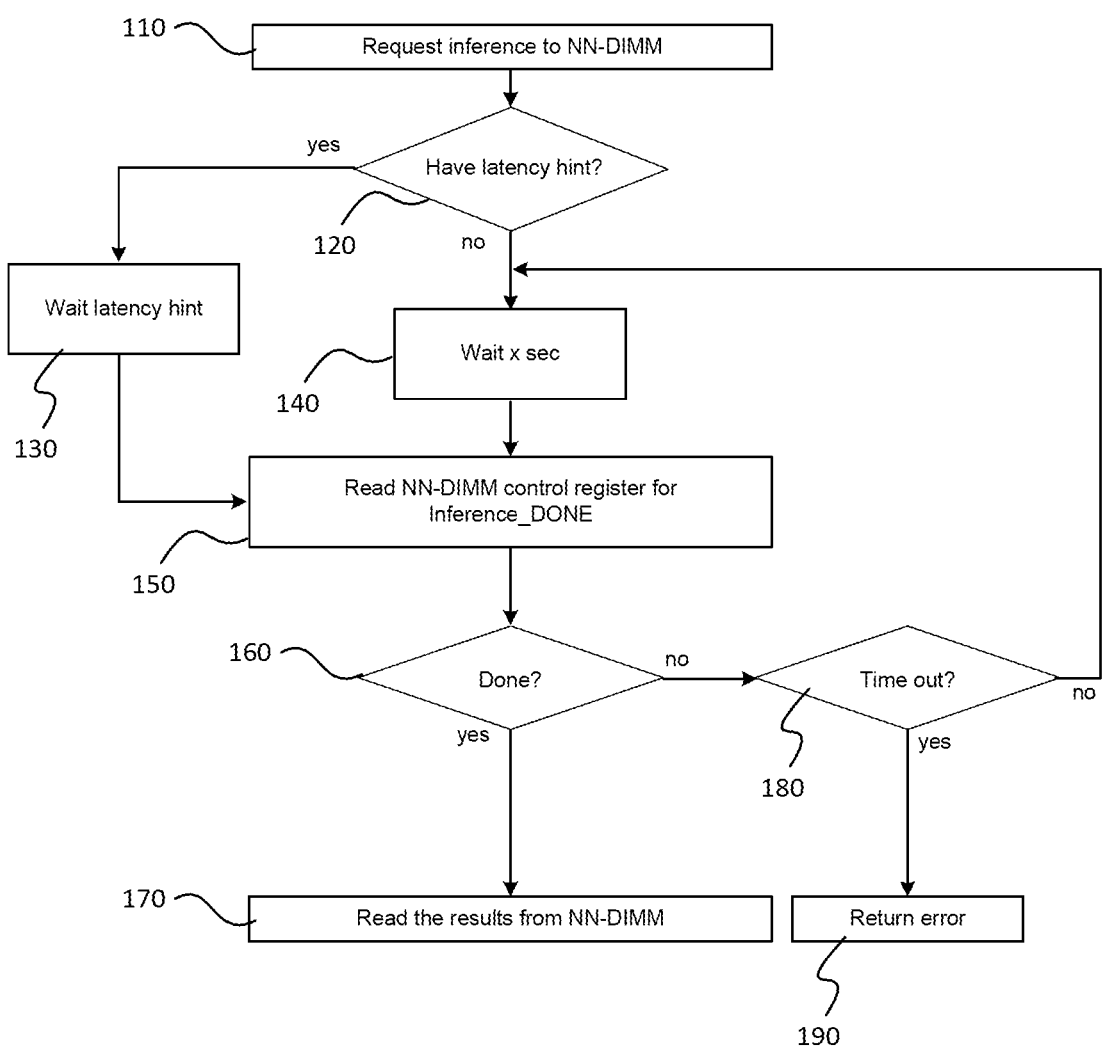
FIG. 4 shows a flow chart of a procedure of reading the inference results from an NN-DIMM, in accordance with aspects of the disclosure.

FIG. 4 shows an example software procedure of reading inference results from an NN-DIMM 10a or 10b. The bridge 30 is configured to create an illusion that the NN-DIMM 10a or 10b is like a standard DDR4 DRAM, so software of a host system 50 may use NN-DIMMs through memory read and write.

Before the example software procedure, the operating system (OS) of the host system 50 should declare physical memory regions mapped to the NN-DIMMs 10a and/or 10b as non-cacheable. In this regard, the CPU 54 memory access to/from the NN-DIMMs bypasses the entire cache hierarchy. The OS may also arbitrate requests to use the NN-DIMMs 10a and/or 10b from user-level applications. For example, the OS may arbitrate requests to export all or part of NN-DIMM memory regions to user-level virtual memory space when needed. Loading a DNN model to a NN-DIMM 10a or 10b may include copying memory. For example, the neural network model description, checkpoint, and other supplemental information may be copied. Requesting a DNN inference also includes copying memory, such as input data. In both cases, in addition to copy operations, commands need to be written to the bridge's control registers 36 and memory mapped. As such, these are memory writes.

A DDR4 does not define asynchronous acknowledgement from the memory. The bus master is always the memory controller and DIMMs are passive and operate with fixed timing. This makes it difficult to decide when the host CPU reads the results from the NN-DIMM. For example, it is difficult to know when the DNN accelerator finishes the inference. Some DNN models run deterministically, so inference latency can be roughly the same regardless of input data. Some other models may include data-dependent loops, such as LSTM models. As such, the pre-evaluated latency may be only a rough estimate.

As shown in block 110, an inference may be requested to the NN-DMM 10a or 10b. Decision block 120 checks if a latency hint has been received. The latency hint may be set from a pre-evaluation of the DNN model. A pre-evaluated inference latency (latency hint) for each model can be used. The host CPU 54 can wait the known inference latency (block 130). The host CPU 54 can then check the NN-DIMM a few more times, as necessary. The host CPU 54 can wait x seconds (block 140). x can be a constant time, determined by heuristic, or dynamically set per model, random value, exponentially increasing value, etc.

In block 150, the host CPU 54 can periodically check whether the requested inference is done, by reading the bridge's register value. In decision block 160, if the inference is done, the procedure reaches block 170, and the host CPU 54 can read the results from the NN-DIMM. If the inference is not done, the procedure reaches decision block 180, and the host CPU 54 checks for a time out, which is a system parameter or user-defined time limit. The host CPU may implement the wait by busy-waiting, process sleep, a combination of both, or other mechanisms. If a time out is received, the procedure reaches block 190, which returns an error. Otherwise, the procedure returns to block 140, and the host CPU 54 can wait x seconds and check again if the requested inference is done.

Alternatively, the DDR4 standard may be extended to add an asynchronous acknowledgement from the NN-DIMM, similar to the DDR-T protocol used for nonvolatile memory on a DDR4 memory channel.

The NN-DIMMs 10a and 10b having a DIMM form factor with a standard DRAM interface may have several advantages over conventional DNN accelerators. For example, deployment may be easier than conventional DNNs. The NN-DIMMs 10a and 10b may fit into standard DIMM slots and may be accessed through a standard DDR4 interface. There is no need for a new cache coherent interface standard and development of related hardware, so an existing host hardware system may be used. Furthermore, modern server CPUs have many memory channels, for example, a ROME CPU has 8 channels, and typical datacenter servers are with 2 CPU sockets, totaling 16 channels. Therefore, it can install 16 NN-DIMMs. This approach enables ample accelerator-level parallelism.

The NN-DIMMs 10a and 10b permit low latency in a DNN model inference, so there is no need to use a PCIe or USB interface. The host CPU may use the DNN accelerator through memory read/write operations, which are inherently fast. The NN-DIMMs 10a and 10b also permit low latency in loading a new DNN model to an accelerator. Model loading is a memory copy. A new model can be loaded even when the accelerator is busy running model inference. This can be particularly useful if an application shows an irregular usage pattern of DNN models. For programmers, using DNN accelerators can be easy. There is no need to access auxiliary devices through PCIe or USB. The NN-DIMMs 10a and 10b also permit better maintainability, in that faulty NN-DIMMs can be easily replaced with new ones, similar to replacement of faulty DIMMs.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A neural network dual in-line memory module (NN-DIMM), comprising:
   a module card having a plurality of parallel edge contacts adjacent an edge of a slot connector thereof and configured to have the same command and signal interface as a standard dual in-line memory module (DIMM);
   a deep neural network (DNN) accelerator affixed to the module card; and
   a bridge configured to transfer information between the DNN accelerator and the plurality of parallel edge contacts via a DIMM external interface, and
   wherein the bridge includes control registers and on-chip memory are accessible as a standard DRAM to a host CPU, wherein the bridge is configured to map the control registers and the on-chip memory to one row of a plurality of banks of the NN-DIMM, and wherein access of the control registers or the on-chip memory is limited to the one row of the plurality of banks.

2. The NN-DIMM of claim 1, comprising a DNN accelerator chip affixed to the module card, the DNN accelerator chip comprising the DNN accelerator, the bridge, and the DIMM external interface.

3. The NN-DIMM of claim 2, wherein the DNN accelerator chip is an off-the-shelf DNN accelerator chip.

4. The NN-DIMM of claim 1, further comprising one or more memory chips affixed to the module card and connected with the bridge via an interface.

5. The NN-DIMM of claim 4, further comprising a memory controller connected with the one or more memory chips and the bridge.

6. The NN-DIMM of claim 1, wherein the bridge includes a controller connected with the DNN accelerator, the control registers, the on-chip memory, and the DIMM external interface.

7. The NN-DIMM of claim 1, further comprising a power connector affixed to the module card and configured to connect to a power cable from a motherboard.

8. The NN-DIMM of claim 1, wherein the plurality of parallel edge contacts includes 288 parallel edge contacts comprising a standard DDR4 contact configuration.

9. A microelectronic system comprising a CPU affixed to a motherboard, the CPU having a plurality of memory channels each including a respective neural network dual in-line memory module (NN-DIMM) electronically connected with the CPU, each NN-DIMM comprising:
   a module card having a plurality of parallel edge contacts adjacent an edge of a slot connector thereof and configured to have the same command and signal interface as a standard dual in-line memory module (DIMM);
   a deep neural network (DNN) accelerator affixed to the module card; and
   a bridge configured to transfer information between the DNN accelerator and the plurality of parallel edge contacts via a DIMM external interface, and
   wherein the bridge includes control registers and on-chip memory are configured to be accessed as a standard DRAM to a host CPU, wherein the bridge is configured to map the control registers and the on-chip memory to one row of a plurality of banks of the NN-DIMM, and wherein the control registers or the on-chip memory access is limited to the one row in the plurality of banks.

10. The microelectronic system of claim 9, wherein the slot connector of each NN-DIMM is mounted inside a corresponding socket connector affixed to the motherboard.

11. The microelectronic system of claim 9, wherein each of the memory channels further includes a standard DIMM.

12. The microelectronic system of claim 9, wherein the plurality of memory channels includes 16 DDR4 memory channels.

13. The microelectronic system of claim 9, comprising a DNN accelerator chip affixed to the module card, the DNN accelerator chip comprising the DNN accelerator, the bridge, and the DIMM external interface.

14. The microelectronic system of claim 9, wherein the DNN accelerator chip is an off-the-shelf DNN accelerator chip.

15. A method of transferring information between a host system CPU and a plurality of neural network dual in-line memory modules (NN-DIMMs), the method comprising:
   electrically connecting each of the NN-DIMMs to the host system CPU, the CPU having a plurality of memory channels each including a respective one of the NN-DIMMs, each of the NN-DIMMs comprising a deep neural network (DNN) accelerator and a bridge configured to transfer the information between the DNN accelerator and the host system CPU via a DIMM external interface, wherein the bridge of each of the NN-DIMMs includes control registers and on-chip memory that are seen as a standard DRAM to the host system CPU and wherein the bridge is configured to map the control registers and the on-chip memory to one row of a plurality of memory banks of the NN-DIMM;
   accessing, by the control registers or the on-chip memory, only the one row in the plurality of banks; and
   transferring the information between the host system CPU and the plurality of NN-DIMMs.

16. The method of claim 15, further comprising the host system controlling the NN-DIMMs through memory read and write operations.

17. The method of claim 15, wherein each of the NN-DIMMs comprises a module card having a plurality of parallel edge contacts adjacent an edge of a slot connector thereof and having the same command and signal interface as a standard dual in-line memory module (DIMM), the slot connector of each NN-DIMM is mounted inside a corresponding socket connector affixed to a motherboard, and the host system CPU is affixed to the motherboard.

18. The method of claim 15, wherein the plurality of memory channels includes 16 DDR4 memory channels.

19. The NN-DIMM of claim 1, wherein the control registers or the on-chip memory accesses the predetermined row in the plurality of banks using only column read or write commands.

20. The NN-DIMM of claim 1, wherein the plurality of banks comprise memory banks formed from the control registers or on-chip memory and that are accessed by the host CPU using column read or write commands.

* * * * *